(12) United States Patent
Zankowski

(10) Patent No.: US 8,594,461 B2
(45) Date of Patent: Nov. 26, 2013

(54) IMAGE DATA COMPRESSION AND DECOMPRESSION

(75) Inventor: Corey E. Zankowski, San Jose, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 534 days.

(21) Appl. No.: 12/896,847

(22) Filed: Oct. 2, 2010

(65) Prior Publication Data

US 2012/0082356 A1    Apr. 5, 2012

(51) Int. Cl.
*G06K 9/32* (2006.01)
*G06K 9/00* (2006.01)

(52) U.S. Cl.
USPC ........................................... 382/294; 382/131

(58) Field of Classification Search
USPC ......... 382/131, 132, 128, 276, 282, 286, 294, 382/295, 300; 600/407, 410, 425
See application file for complete search history.

(56) References Cited

U.S. PATENT DOCUMENTS

| | | | |
|---|---|---|---|
| 6,950,542 B2 * | 9/2005 | Roesch et al. | 382/128 |
| 8,270,693 B2 * | 9/2012 | Zou et al. | 382/128 |
| 8,358,818 B2 * | 1/2013 | Miga et al. | 382/128 |
| 2008/0044104 A1 * | 2/2008 | Gering | 382/294 |

\* cited by examiner

*Primary Examiner* — Yon Couso
(74) *Attorney, Agent, or Firm* — Vista IP Law Group, LLP

(57) ABSTRACT

A method of processing image data includes obtaining an image set that includes at least a first image and a second image, determining a deformation registration using the first and second images, wherein the act of determining the deformation registration is performed using a processor, performing image compression on at least a portion of the image set using the determined deformation registration to obtain compressed image data, and storing the compressed image data. A method of processing image data includes obtaining compressed image data, obtaining a deformation registration previously used to create the compressed image data, performing image decompression on the compressed image data using the deformation registration to obtain decompressed image data, wherein the act of performing the image decompression is performed using a processor, and storing the decompressed image data.

28 Claims, 9 Drawing Sheets

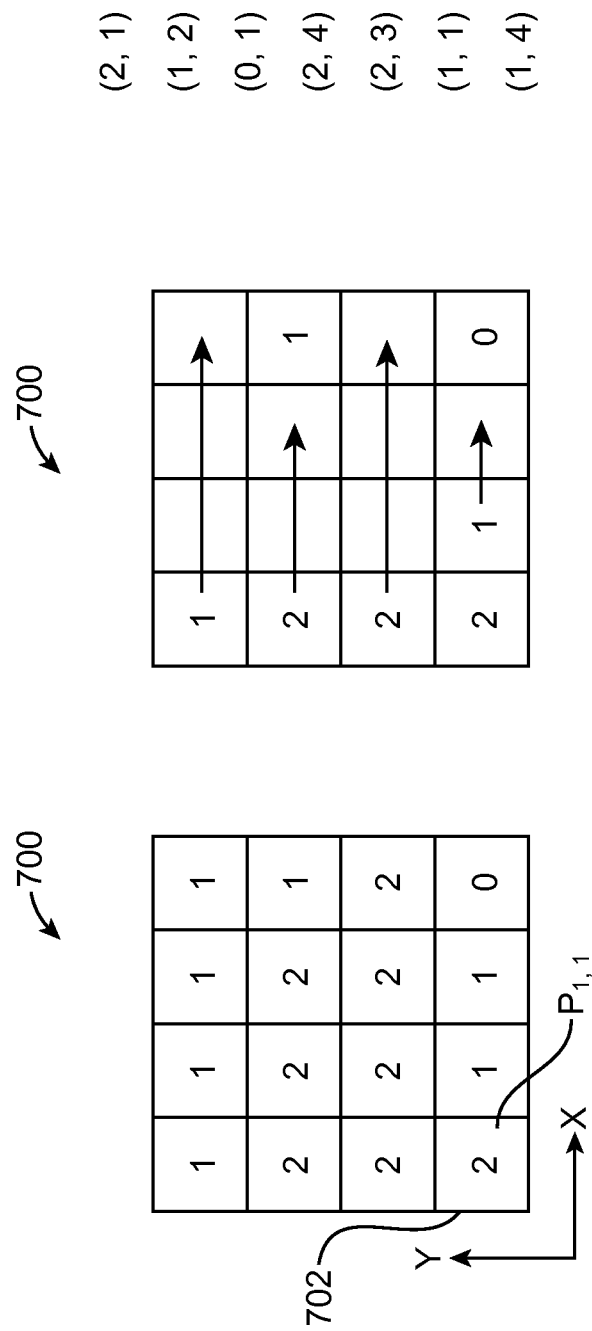

IMAGE DATA COMPRESSION AND DECOMPRESSION

FIELD

This application relates generally to image data processing, and more particularly, to systems and methods for compressing and decompressing medical image data, such as those obtained using radiation, MRI, etc.

BACKGROUND

Radiation has been employed to obtain images of patients for medical purposes. For example, in a computed tomography (CT) procedure, a diagnostic energy beam is applied from an external source towards the patient from different gantry angles to obtain different respective projection images. The projection images may then be used to reconstruct a volumetric image. The volumetric image may be used to examine tissue for diagnosis purpose and/or for treatment planning purpose.

In some cases, different volumetric images for different respective phases of a physiological cycle are obtained, and the different volumetric images may be displayed in a time or phase sequence to form an animated image, or movie (4D CT). Such a movie allows a physician or a treatment planner to see how different tissues move as the patient experiences physiological movement, thereby allowing treatment planning to incorporate patient movement. Procedures for 4D CT involve obtaining projection image data for different phases of a motion cycle (e.g., respiratory, cardiac), and then using the image data to reconstruct volumetric images for different phases. The resulting images may be displayed in a sequence to form a video.

Currently, the entire image data set for a volumetric image is stored. For the case of a 4D CT image set, the entire image set is also stored. For the case of a sequentially registered 4D CT image set, registration matrices connecting each phase are also stored. Applicant of the subject application determines that individually storing each of the pixel values in a volumetric image, or individually storing each of the pixel values in each of the volumetric images in a movie along with the registration matrices, requires significant storage space. Thus, Applicant determines that a system and method for compressing and decompressing image data would be desirable.

SUMMARY

In accordance with some embodiments, a method of processing image data includes obtaining an image set that includes at least a first image and a second image, determining a deformation registration using the first and second images, wherein the act of determining the deformation registration is performed using a processor, performing image compression on at least a portion of the image set using the determined deformation registration to obtain compressed image data, and storing the compressed image data.

In accordance with other embodiments, a system for processing image data includes a processor configured for obtaining an image set that includes at least a first image and a second image, determining a deformation registration using the first and second images, performing image compression on at least a portion of the image set using the determined deformation registration to obtain compressed image data, and storing the compressed image data.

In accordance with other embodiments, a computer product having a volatile or non-volatile medium that stores a set of instruction, an execution of which by a processor causes a method for processing image data to be performed, the method includes obtaining an image set that includes at least a first image and a second image, determining a deformation registration using the first and second images, performing image compression on at least a portion of the image set using the determined deformation registration to obtain compressed image data, and storing the compressed image data.

In accordance with other embodiments, a method of processing image data includes obtaining compressed image data, obtaining a deformation registration previously used to create the compressed image data, performing image decompression on the compressed image data using the deformation registration to obtain decompressed image data, wherein the act of performing the image decompression is performed using a processor, and storing the decompressed image data.

In accordance with other embodiments, a system for processing image data includes a processor configured for obtaining compressed image data, obtaining a deformation registration previously used to create the compressed image data, performing image decompression on the compressed image data using the deformation registration to obtain decompressed image data; and storing the decompressed image data.

In accordance with other embodiments, a computer product having a volatile or non-volatile medium that stores a set of instruction, an execution of which by a processor causes a method for processing image data to be performed, the method includes obtaining compressed image data, obtaining a deformation registration previously used to create the compressed image data, performing image decompression on the compressed image data using the deformation registration to obtain decompressed image data, and storing the decompressed image data.

Other and further aspects and features will be evident from reading the following detailed description of the embodiments, which are intended to illustrate, not limit, the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIGS. 6A-6C illustrate a method of compressing image data in accordance with some embodiments;

DESCRIPTION OF THE EMBODIMENTS

Figure 1:
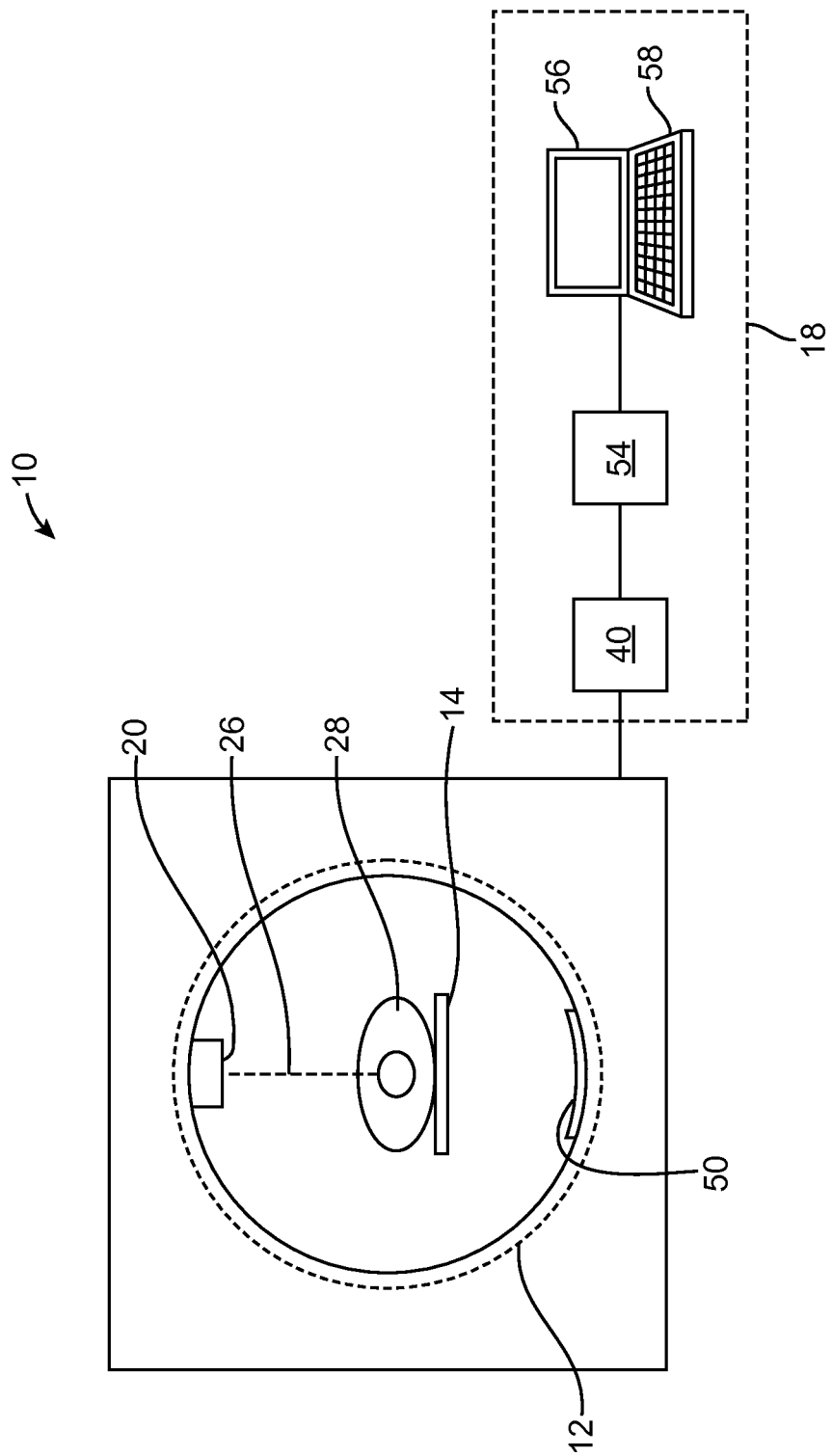
FIG. 1 illustrates a system for obtaining image(s) of a patient in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a radiation imaging system 10 for obtaining image(s) of a patient in accordance with some embodiments. As used in this specification, the term "image" is not limited to an image that is displayed, and may refer to image data that is not displayed, such as image data that is stored in a medium. The system 10 includes a gantry 12 (in the form of a ring), a patient support 14 for supporting a patient 28, and a control system 18 for controlling an operation of the gantry 12. In other embodiments, the radiation source 20 may be coupled to an arm gantry instead of the ring gantry 12. The system 10 also includes a radiation source 20 that projects a beam 26 of radiation towards the patient 28 while the patient 28 is supported on the support 14. The radiation source 20 can be configured to generate a cone beam, a fan beam, or other types of radiation beams in different embodiments.

In the illustrated embodiments, the radiation source 20 is a diagnostic radiation source for providing imaging energy. In other embodiments, in addition to being a diagnostic radiation source, the radiation source 20 can also be a treatment radiation source for providing treatment energy. In some embodiments, the treatment energy is generally those energies of 160 kilo-electron-volts (keV) or greater, and more typically 1 mega-electron-volts (MeV) or greater, and diagnostic energy is generally those energies below the high energy range, and more typically below 160 keV. In other embodiments, the treatment energy and the diagnostic energy can have other energy levels, and refer to energies that are used for treatment and diagnostic purposes, respectively. In some embodiments, the radiation source 20 is able to generate X-ray radiation at a plurality of photon energy levels within a range anywhere between approximately 10 keV and approximately 20 MeV.

The system 10 also include an imager 50 located at an operative position relative to the source 20. The imager 50 is configured to receive radiation that has passed through the patient 28, and generate image signals in response to the received radiation. The image signals may be transmitted to a processor 54 (or another processor) for processing in accordance with embodiments described herein. As used in this specification, the term "processor" is not limited to a processing device that is coupled to an imaging system, and may refer to any processing device that is capable of performing data processing, wherein the processing device may include one or more processing units. For example, in other embodiments, the processor may be a part of a computer that is separate from the image acquisition device 10, or may be a part of a PDA. In some embodiments, the image signals from the imager 50 may be stored in a medium, such as a memory, a CD ROM, a database, etc., for later processing.

In the illustrated embodiments, the control system 18 includes a processor 54, such as a computer processor, coupled to a control 40. The control system 18 may also include a monitor 56 for displaying data and an input device 58, such as a keyboard or a mouse, for inputting data. In the illustrated embodiments, the gantry 12 is rotatable about the patient 16, and during an imaging procedure, the gantry 12 rotates about the patient 16 to deliver diagnostic radiation from different gantry angles. The operation of the radiation source 20 and the gantry 12 are controlled by the control 40, which provides power and timing signals to the radiation source 20, and controls a rotational speed and position of the gantry 12, based on signals received from the processor 54. The control 40 may also be configured to provide timing signals for accessing image signals from the imager 50. Although the control 40 is shown as a separate component from the gantry 12 and the processor 54, in alternative embodiments, the control 40 can be a part of the gantry 12 or the processor 54.

It should be noted that the system 10 is not limited to the configuration described above, and that the system 10 may have other configurations in other embodiments. For example, in other embodiments, the system 10 may have a different shape. In other embodiments, the radiation source 20 of the system 10 may have different ranges of motions and/or degrees of freedom. For example, in other embodiments, the radiation source 20 may be rotatable about the patient 28 completely through a 360° range, or partially through a range that is less than 360°. Also, in other embodiments, the radiation source 20 is translatable relative to the patient 28. Further, the radiation source 20 is not limited to delivering treatment energy in the form of x-ray, and may deliver other types of radiation energy.

In some embodiments, the imaging system 10 may be configured to obtain projection data from different gantry angles that is sufficient for constructing a volumetric image (e.g., a CT image) for at least a part of the patient 28. In other embodiments, if the portion of the patient 28 that is being imaged moves (e.g., due to breathing, cardiac movement, etc.), then the imaging system 10 may be configured to obtain projection data that is sufficient for constructing volumetric images for different phases of the physiological cycle of the patient 28. In such cases, projection data that correspond to the same phase (or phase range) of the physiological are grouped together for construction of the volumetric image for that particular phase (or phase range). The different volumetric images for different respect phases of the physiological cycle may then be displayed in a sequence to form a movie (video). If cone beam radiation is used to obtain the sequence of volumetric images, the resulting set of images is a four dimensional (4D) CBCT set, with the fourth dimension being time. In some embodiments, the set of volumetric images may be transmitted to a processor (such as processor 54) for processing in accordance with embodiments described herein. In other embodiments, the set of volumetric images may be stored in a medium for later processing.

In the above embodiments, the system 10 has been described as a CT system. In other embodiments, the system 10 may be other types of imaging systems, such as a MRI system, an ultrasound system, an x-ray system, a PET system, a SPECT system, etc. In such cases, the image data generated by the system 10 may be other types of images, such as MRI images, ultrasound images, x-ray images, PET images, SPECT images, etc, or any images that are capable of being digitized.

Figure 2:
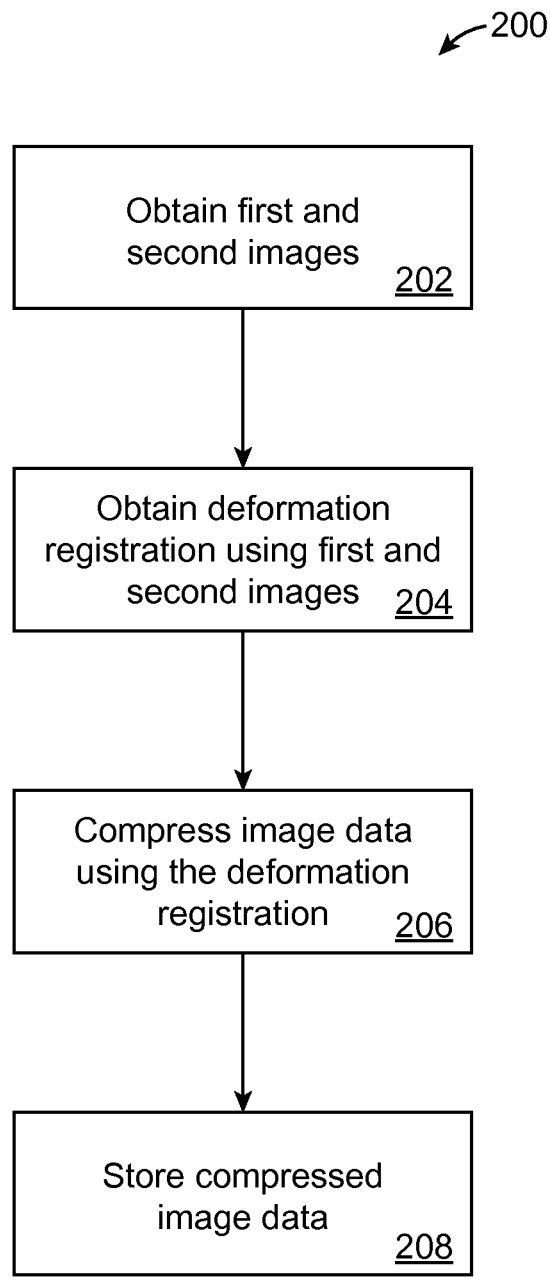
FIG. 2 illustrates a method of compressing image data that involves deformation registration in accordance with some embodiments.

FIG. 2 illustrates a method 200 of compressing image data that involves deformation registration in accordance with some embodiments. First, an image set that includes at least a first image and a second image is obtained (Step 202). In some embodiments, such may be accomplished by a processor (such as the processor 54) receiving the image set, or by allowing the processor to have access to a medium that stores the image set. In some embodiments, the image set may include image data for a volumetric image (e.g., a CT image, a tomosynthesis image, etc.). In such cases, the first and second images may be different image slices of the volumetric image. In other embodiments, the image set may include image data that correspond with different respective phases of a physiological cycle (such as a breathing cycle, a cardiac cycle, etc.) of a patient. In such cases, the first and second images may be different frames from a movie. Each of the frames from the movie may be a two-dimensional image, or a three-dimensional image. In further embodiments, the first and second frames may be images obtained at different times. As used in this specification, the terms "first" and "second" (as in "first frame" and "second frame", or "first image" and "second image") are used to identify different images, and may not necessarily indicate the temporal ordering of the images. For example, the "first frame" may be a third image slice in the image set, and the "second frame" may be a second image slice in the image set.

Figure 3:
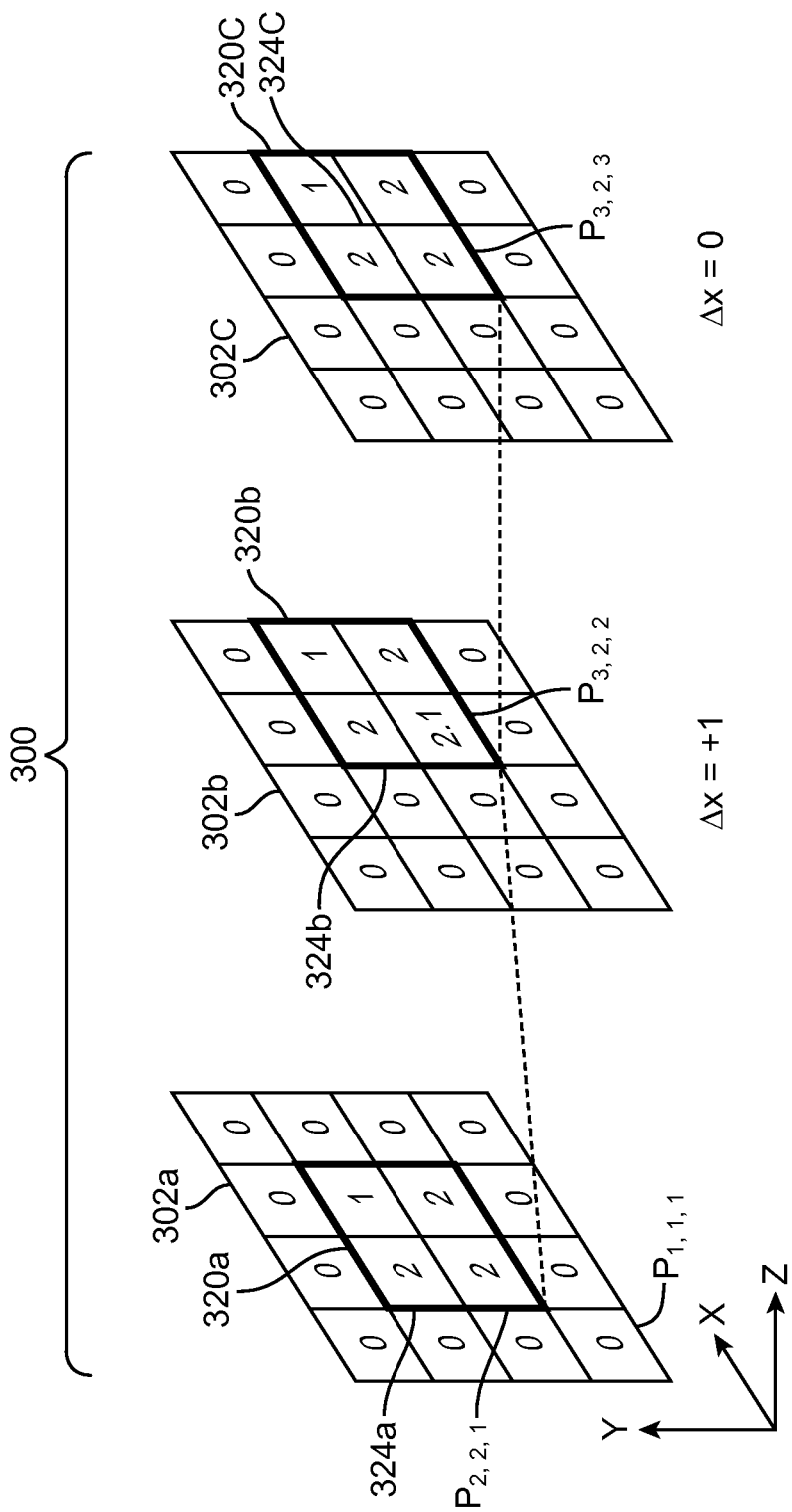
FIG. 3 illustrate a concept of compressing image data that involves deformation registration in accordance with some embodiments.

Next, the processor determines a deformation registration using the first and second frames (Step 204). Deformable image registration is a process or technique in which points in a first frame of a first object (such as a target region and/or a critical organ) are associated with corresponding points in a second frame of a second object, wherein the first and second objects may have the same or different sizes and/or shapes. FIG. 3 illustrates an example of how deformation registration may be applied to a volumetric image 300 that includes three image slices 302a-302c. The image slices 302a-302c are arranged in the Z-direction, which corresponds with the axis of a bore of an imaging machine (such as the device of FIG. 1) in some embodiments. Although three image slices are shown, and each slice is illustrated as having sixteen pixels, in other examples, there may be more or less than three image slices, and there may be more or less than sixteen pixels. In the example, the image slice 302a has an image of an object 320b (defined by pixel values that are higher than 0). In particular, the object 320a has pixel values of 1 and 2. In other examples, the object 320a may have different shapes, and/or may have pixels with different values from that shown. As shown in the figure, the object 320b in the second image slice 302b (e.g., a second image) is shifted to the right by 1 pixel relative to the first image slice 302a (e.g., a first image). The image of the object 320c in the image slices 302c stays in the same position in the image frame relative to the image slice 302b. Thus, in the illustrated embodiments, the processor may determine that the deformable registration for mapping between the image slice 302a and the image slice 302b includes a rigid translation of ΔX=1, and that the deformable registration for mapping between the image slice 302b and the image slice 302c includes no rigid translation (ΔX=0).

Next, the processor performs image compression on at least a portion of the image set using the determined deformation registration to obtain compressed image data (Step 206). In some embodiments, the image compression may be performed by compressing image data across image slices in the Z-direction (or any of other directions that are different from the Z-direction). In the above example, since the pixel 324a in the image slice 302a is associated with the pixel 324b in the image slice 302b based on the determined deformation registration (ΔX=1), the processor may store the pixel value for pixel 324a once, and use the deformation registration to keep track that the corresponding pixel 324b in the image slice 302b is shifted in the X-direction by 1 pixel relative to the adjacent slice 302a. Thus, this obviates the need to store multiple pixel values across different image slices. Also, in the above example, since the pixel 324b in the image slice 302b is associated with the pixel 324c in the image slice 302c, the processor may use the deformation registration (ΔX=0) to keep track that the pixel 324c in the image slice 302c does not move relative to the corresponding pixel 324b in the adjacent image slice 302b. Accordingly, the processor 54 may store the value "0" to keep track of the relative shift without storing the pixel value.

In the above example, the configuration (e.g., shape and size) of the object 320 (defined by pixel values that are higher than 0) does not change from slice 302a to slice 302b to slice 302c. Thus, the deformation registration for these image slices (or for components within the image slices) includes only a rigid translation component. In the above example, the processor may determine that the compressed data set includes pixel values for the object 320a in image slice 302a (reference image), and the translation components (e.g., ΔX=1, ΔX=0) for the respective image slices 302b, 302c (Step 206). The processor then stores the compressed image set in a medium (Step 208). As shown in the above example, the image data compression technique obviates the need to store each of the pixel values for different respective image slices 302a-302b.

In some embodiments, the pixel value may be allowed to vary within a prescribed range, and still be considered to be in correspondence with the pixel in another image for image compression purpose. In the above example, the pixel value for pixel $P_{3,2,2}$ (with convention $P_{x,y,z}$) in the second image slice 302b is "2.1," but may still be considered to be in correspondence with the pixels $P_{2,2,1}$ and $P_{3,2,3}$ (each having a value of "2") in the adjacent slices 302a, 302c. In some embodiments, a user interface may be provided that allows a user to prescribe a deviation range for associating pixels. For example, if the user prescribes that the deviation range is 4, then a pixel will be determined by the processor to be in correspondence with another pixel if the difference in pixel values is less than 4.

Figure 4:
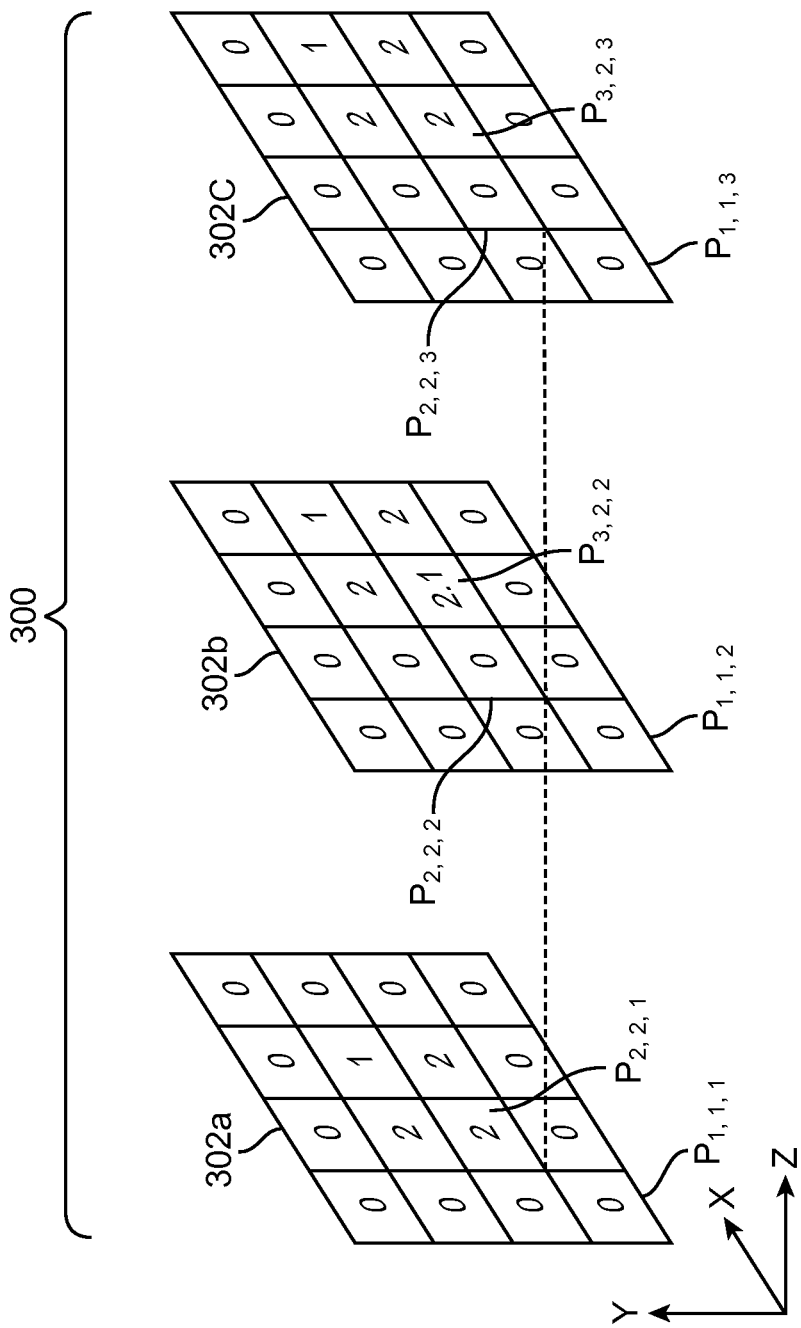
FIG. 4 illustrates another technique of compressing image data.

As illustrated in the above example, by registering different image portions from different images using deformable image registration technique, compression of image data may be achieved efficiently based on the registration of image portions from different images. In particular, as can be seen from the above example, by determining that the pixels $P_{2,2,1}$, $P_{3,2,2}$, and $P_{3,2,3}$ from respective images 302a-302c correspond to each other (e.g., with values that belong to the same class of tissue, or with values that are all within a prescribed range), the compression in the Z-direction may be performed across these three pixels, even though they do not align with each other—i.e., the pixel $P_{2,2,1}$ is at a different position with respect to an image frame from the pixel $P_{3,2,2}$ and the pixel $P_{3,2,3}$. Such technique is advantageous over analyzing image pixels that are at the same spatial location in each image frame for image data compression (see FIG. 4). FIG. 4 shows the same volumetric image 300 with the same image slices 302a-302c. As illustrated in the figure, if deformable registration is not used, then performing image compression across the slices (e.g., in the Z-direction) would involve analyzing pixel values that are at the same spatial position in each slice. In the example, the pixel $P_{2,2,1}$ in the slice 302a has a value of 2. However, the pixels $P_{2,2,2}$ and $P_{2,2,3}$ that are in the same spatial position relative to the image frame have values of 0. So the value of $P_{2,2,1}$ is not grouped with the values of $P_{2,2,2}$ and $P_{2,2,3}$ for image data compression. On the other hand, by using the deformable registration technique described herein, the processor will recognize that the pixel $P_{2,2,1}$ is associated with pixels $P_{3,2,2}$ and $P_{3,2,3}$ (because they have the same value or are within a same value range), and will group them together for the purpose of image data compression.

In the above example, the deformation registration is described has having one local translation for an image portion within the image. However, in other examples, the deformation registration may have more than one translation component. For example, in other embodiments, the deformation registration may have local translation components for an image portion in any one or any combination of the three axes X, Y, Z.

It should be noted that the deformation registration is not limited to having only translation(s). In other embodiments, the deformation registration determined by the processor may include a rotation component that maps how an image portion is rotated to achieve another image portion. In some cases, an image portion may have more than one rotation component. For example, a part of an image portion may have a positive rotation component (representing the condition that the part of an image portion needs to be rotated clockwise to map to another part of another image portion), and a negative rotation component (representing the condition that another part of the image portion needs to be rotated counter-clockwise to map to another respective part of the other image portion).

In further embodiments, the deformation registration may include one or more scaling components for an image portion. For example, the deformation registration may include a scaling component for an image portion in a X-direction, and another scaling component for the image portion in the Y-direction. A scaling component with a value greater than 1 represents the situation in which the image portion has been stretched. A scaling component with a value less than 1 represents the situation in which the image portion has been compressed.

In some cases, the deformation registration for an image portion may include any combination of translation component(s), rotation component(s), stretching component(s), and compression component(s). The deformation registration for completely mapping two images may include different deformation registration components for different image portions. In such cases, each deformation registration components for each image portion may include any combination of translation component(s), rotation component(s), stretching component(s), and compression component(s).

Figure 5:
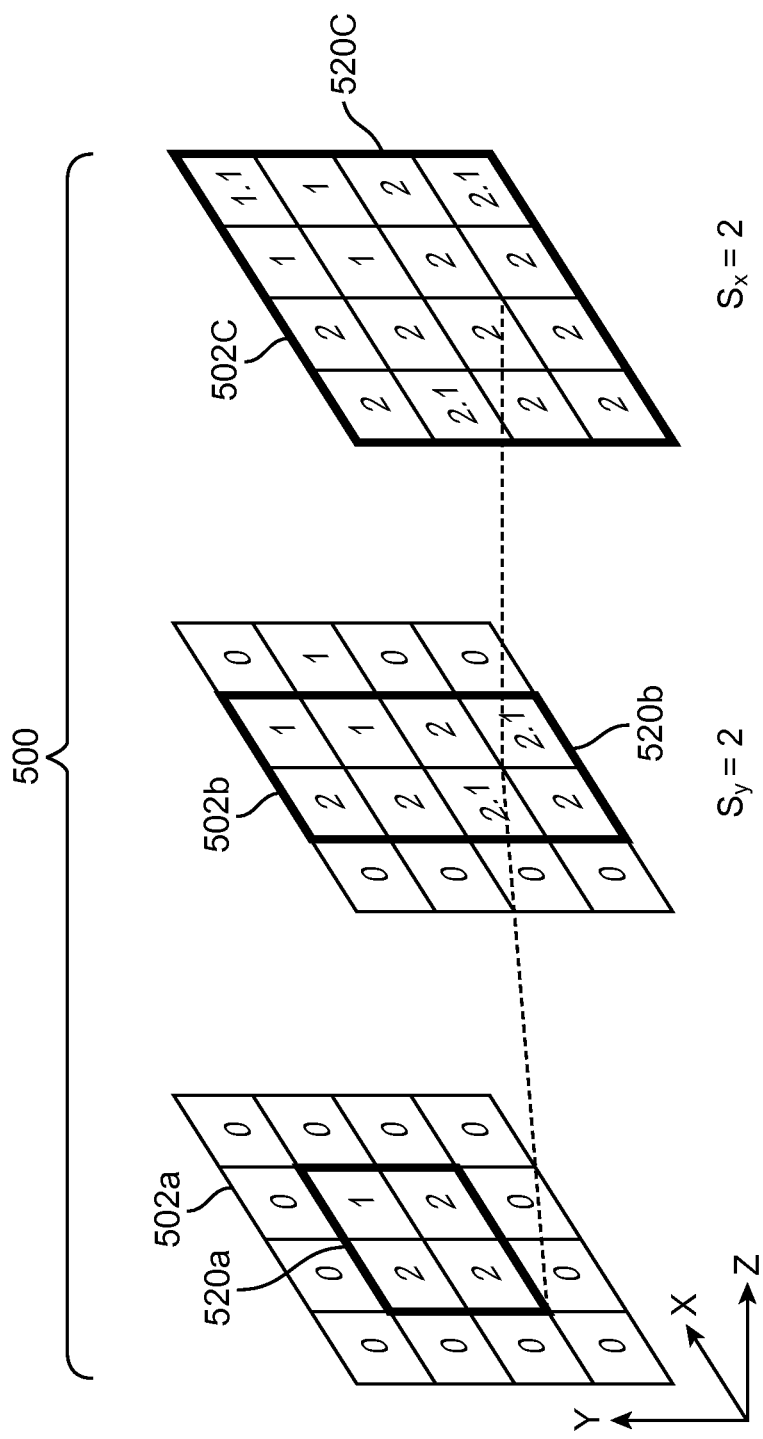
FIG. 5 illustrate another concept of compressing image data that involves deformation registration in accordance with some embodiments.

As discussed, in some embodiments, instead of, or in addition to, having a translation and/or rotation component(s), the deformation registration may include scaling component(s). FIG. 5 illustrates another example of a volumetric image 500 that includes three image slices 502a-502c. The image slices 502a-502c are arranged in the Z-direction, which corresponds with the axis of a bore of an imaging machine (such as the device of FIG. 1) in some embodiments. In other embodiments, the image slices may be arranged in other directions. Although three image slices are shown, and each slice is illustrated as having sixteen pixels, in other examples, there may be more or less than three image slices, and there may be more or less than sixteen pixels. In the example, the image of an object 520a (defined by pixel values that are higher than 0) is scaled by a factor of 2 in the Y-direction between image slice 502a (e.g., a first image) and image slice 502b (e.g., a second image). The image of the object 520b (defined by pixel values that are higher than 0) is scaled by a factor of 2 in the X-direction between image slice 502b and image slice 502c. Thus, in this example, the processor may determine that the deformation registration between the image slices 502a and 502b has a scaling component of Sy=2, and that the deformation registration between the image slices 502b and 502c has a scaling component of Sx=2. In such cases, the volumetric image 500 may be compressed by including the pixel values for the object 520a from the first image slice 502a, and the scaling factors (e.g., Sy=2, Sx=2) for the respective image slices 502b, 502c, in a compressed image set (Step 206). The compressed image set may then be stored in a medium (Step 208).

In some embodiments, an image may include different image portions for different respective objects. In such cases, the deformation registration obtained in Step 204 may include one or a combination of translation component(s) (e.g., translation in one or more directions), rotation component(s), and scaling component(s) (e.g., scaling in one or more directions), for each of the image portions in an image. For example, an image may include two image portions of two respective objects (which for example, may be two different portions of an organ, or two different organs). In another image, one of the objects may move in the X-direction by 1 unit ($\Delta X=1$), and the other one of the objects may move in the Y-direction by 3 units ($\Delta Y=3$) and in the X-direction by 2 units ($\Delta X=2$). As another example, a first image may include a first object that rotates clockwise ($\Delta\theta=-30°$) compared to a corresponding object in a second image, while another object in the same first image may rotate counter clockwise ($\Delta\theta=15°$) compared to a corresponding object in the same second image. As another example, a first image may include a first object that is scaled by (Sx=1.4 and Sy=2) compared to a corresponding object in a second image, while another object in the same first image may be scaled by (Sx=−1.3 and Sy=3) compared to a corresponding object in the same second image. Thus, a deformation registration for mapping two images may include different components for different parts of the same image. In some embodiments, the processor may be configured to perform image segmentation to divide the image into different image portions. The image segmentation may be performed such that different image portions in one image may be mapped to different image portions in another image. The segmentation of one image may be different from the segmentation of another image.

In the above examples, the different images are adjacent image slices (e.g., at different positions). In such cases, the image portions in the respective images correspond to different tissue (which may or may not be belong to a same organ or class of tissue). As a result, the deformable registration and image data compression technique described above is performed with respect to the space domain. In other embodiments, the different images may be images from different phases of a physiological cycle, in which cases, the image portions in the respective images correspond to a same tissue. As a result the deformable registration and image data compression technique described above may be performed with respect to the time domain. In further embodiments, the above deformable registration and image compression technique may be performed in both the space domain and time domain. For example, in the case in which the image data to be compressed is a set of volumetric images at different phases, such as a 4D CBCT set, the processor may compress the image data in the space domain for each volumetric image at a given phase (or phase range), and then compress the image data in the time domain across the different volumetric images at different respective times.

In some embodiments, the inherent noise in the 4D image data set can be reduced by analyzing the pixel signal from adjacent phases and adjacent slices of the data set using the appropriate deformation field to compute a space-time weighted average of the pixel values before compression. In some embodiments, an equal weighting may be applied for all voxels that are co-registered to the same reference voxel or voxel location. Co-registered voxels may be from each common phase or phase range in a respiratory image (e.g., 4D CT image) and/or from adjacent images (e.g., adjacent images slices in a volumetric image, adjacent image frames in a movie). In other embodiments, the distance between voxels can be used to modulate the weighting. For example, the weighting factor may be reduced the further away in distance or time a voxel is from another voxel (e.g., a reference voxel). In further embodiments, the uncertainty in the deformable registration can be used to determine the weighting. For example, the less certain the mapping, the lower the weighing factor. Using images with a higher signal-to-noise ratio can result in higher fidelity data compression in the time domain and space domain.

As illustrated in the above embodiments, the image data compression may be performed in the time and space domain by tracking the motion of each pixel from one frame to the next. For example, deformable image registration is able to map pixel motion from one image slice to the next in a volumetric image set, and/or from one phase to the next in a 4D CT data set. The motion vector field for the volumetric image set, or for the 4D CT data set, can be used to compress the data set along the time axis. Various techniques may be used by the processor to perform deformable image registration between different images to determine how one region in an image corresponds with another region in another image. The deformation registration (or the deformation field) resulted from the deformation registration technique that maps points from one image to another image may include a rigid component, such as a translation component, a rotation component, or a combination of both. For example, consider the following two images:

01200133000 first image
00012001300 second image

The deformation registration that maps these two images would be:

22222221111 in which each number denotes how much the corresponding point in the first image needs to be moved to the right in order to match the second image. In some embodiments, the rigid component(s) (e.g., translation component, rotation component) and/or the scaling component in the deformation registration may be removed to allow a user to evaluate how well an image matches another image. Using the above example, the rigid component may be removed from the deformation registration to obtain the remaining deformation registration, as follows:

22222221111 Deformation registration
22222222222 Rigid component (shift image to right by two units)
0000000(−1)(−1)(−1)(−1) Remaining component in deformation registration The rigid component and the remaining component of the deformation registration may be applied to the first image to accomplish the second image, as follows:

01200133000 first image
00012001330 Applying rigid component (shift image to right by two units)
00012001300 Applying remaining component (move latter part left by one unit)

As shown in the above example, the region that comprises of 3's is compressed to fit the second image. Thus, the deformation registration contains a rigid component that moves the first image to the right by two units, and a component that compresses the region with 3s.

In some embodiments, the processor (e.g., the processor 54) is configured to determine how much deformation is needed to achieve a mapping between images after the translation component(s), rotation component(s), and scaling component(s) are removed from the deformation registration. This would allow a user to know how much localized change in one image is needed in order to achieve the other image (e.g., the adjacent image slice, or the image in the adjacent phase). For example, in the above example, the processor may calculate that there is one point in the image where compression occurs. In another embodiment, the processor may calculate how much absolute movement is left in the remaining component in order to achieve the image being considered. In the above example, the processor would determine that there are four components (with value of −1) in the remaining component that are needed to be adjusted in order to achieve the second image.

It should be noted that the deformable registration technique that may be used is not limited to the examples described, and that other deformable registration techniques may be used in different embodiments. Deformable image registration algorithms are known in the art, and will not be described in further details. Also, it should be noted that any of the deformation registration, the translation component(s), the rotation component(s), and the scaling component(s) is not limited to a two dimensional matrix illustrated in the above examples, and that in other embodiments, any of the deformation registration, the translation component(s), the rotation component(s), and the scaling component(s) may be a three dimensional matrix. Further, it should be noted that the remaining deformation registration (i.e., the remaining component of a deformation registration) is not limited to having one localized change for an image, and that in other embodiments, the remaining deformation field may represent more than one localized changes in an image. For example, after the rigid component(s) and the scaling component(s) have been removed from the deformation registration, the remaining deformation registration may indicate that a plurality of regions in an image needs to be adjusted in order to map to another image (e.g., adjacent image slice, or image at an adjacent phase of a physiological cycle). One region may require compression, and another region may require expansion. In another case, one region may require compression by a first magnitude (e.g., 1 unit), and another region may require compression by a second magnitude (e.g., 3 units). Also, In some cases, the direction of compression/expansion in one region may be different from the direction of compression/expansion in another region. Thus, embodiments of the deformation registration may include one or more compression components, and/or one or more expansion components.

In some embodiments, the processor may remove the rotation, translation, and scaling components from the deformation field by finding the best combination of these components that would result in the smallest amount of change in the remaining deformation field. In some cases, the translation component may be determined by calculating the average vector inside a region of interest.

In other embodiments, the processor may be configured to calculate divergence and curl components of the deformation field for each point, convert those to absolute values, and integrate over the field. The above techniques provide information regarding how much different the relative positions of the biological reference points are in the images. They also provide information about where the differences are (e.g., locations where the deformation field is divergent).

In any of the embodiments described herein, image compression may be performed for pixel values that are in an image slice. For example, in some embodiments, after the deformable registration has been performed, the image data in an image (e.g., a reference image) may be "compressed" to further reduce information down to a smaller set. In some cases, the processor may be configured to examine the entire data set to be stored (e.g., time-sequence image data, and its corresponding registration matrix), and reduce the information that is redundant in order to achieve the data compression. Various techniques, such as a statistical technique or a transformation into the frequency domain, may be used to compress image data within an image. FIGS. 6A-6C illustrate a technique for compressing image data from a same image slice. FIG. 6A shows an image 700 that has four pixels in the X-direction, and four pixels in the Y-direction. Thus, the image 700 is a 4×4 image with sixteen pixels 702. In other examples, the image 700 may have more than sixteen pixels. The pixel P at the lower left corner of the image 700 has coordinate (1,1), and a pixel value of 2 (i.e., $P_{1,1}$=2). The pixel to the right ($P_{2,1}$) has intensity of 1. Similarly, the pixel $P_{3,1}$ has intensity of 1, and pixel $P_{4,1}$ has intensity of 0. The second row of the pixels $P_{x,2}$ all have intensity values of 2. The pixels in the third row, $P_{1,3}$, $P_{2,3}$, $P_{3,3}$, $P_{4,3}$ have respective intensity values of 2, 2, 2, 1. The fourth row $P_{1,4}$, $P_{2,4}$, $P_{3,4}$, $P_{4,4}$ have respective intensity values of 1, 1, 1, 1.

As shown in FIG. 6B, one technique of compressing the image data in the image 700 involves analyzing the pixel values in the X-direction one row at a time, starting with the first row, to determine if there are pixels that may be grouped together in the compression process. Starting with the first row, $P_{1,1}$ has intensity value of 2 that is different from its adjacent pixel. Thus, $P_{1,1}$ will not be grouped with the adjacent pixel. As a result, the data that correspond with the pixel $P_{1,1}$ will be stored as (2,1) in a compressed file under the format (v, n), wherein v is the value for the pixel, and n is the number of repeats (see first set of values in FIG. 6C). The next two pixels $P_{2,1}$ and $P_{3,1}$ both have pixel values of 1, and so these two pixels will be grouped together. Thus, the data that correspond with these pixels will be stored as (1, 2) in the compressed file. The next pixel $P_{4,1}$ has pixel value of 0, and so it will be stored as (0, 1) in the compressed file.

After processing pixel values at the first row, the processor then moves on to the next row. The second row has four pixels $P_{x,2}$ all with value of 2, and so these pixel values will be stored as (2, 4) in the compressed file. Continuing with such data compression technique, the image 700 of FIG. 6A may be represented by the compressed data shown in FIG. 6C. As shown in the example, the set of data in FIG. 6C has fourteen values, which is less than the sixteen values of the sixteen pixels that would have been stored individually if compression technique is not used.

In other embodiments, instead of starting at the lower left corner of an image frame, the compression of the image data may begin at other locations (e.g., top left, top right, lower right, etc.).

Figures 7A, 7B:
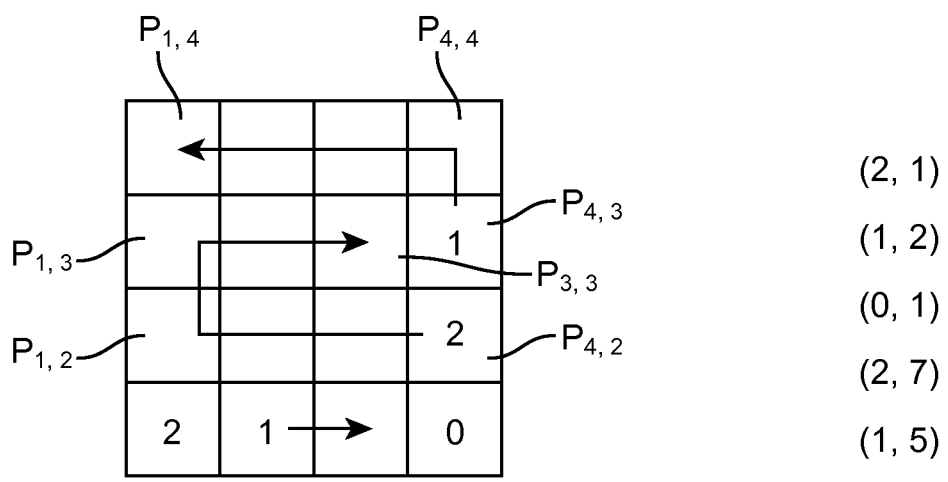
FIGS. 7A and 7B illustrate another method of compressing image data in accordance with other embodiments.

Alternatively, the processing of the pixel values may be performed by the processor in a left-and-right configuration. In such cases, the image 700 of FIG. 6A may be analyzed as a continuous string of data. Using such technique, the first row of the image 700 would be processed from left-to-right, and yield the same compression results. Thus, (2, 1), (1, 2), and (0, 1) would be stored in the compression data that represent the pixel values in the first row. After processing the fourth pixel $P_{4,1}$ in the first row, the processor then moves up and starts with pixel $P_{4,2}$, and examines the remaining pixels in that row from right-to-left. After the pixel $P_{1,2}$ is processed, the processor has registered that there are four pixels with value of 2 in the second row. However, instead of including (2, 4) in the compressed data set, the processor continues to examine the next row starting with pixel $P_{1,3}$ to see if it has the same pixel value. In the illustrated example, the pixel $P_{1,3}$ to $P_{3,3}$ all have a value of 2. Thus, the processor will determine that the pixels from $P_{4,2}$ to $P_{1,2}$ to $P_{1,3}$ to $P_{3,3}$ (see FIG. 7A) all have a value of 2. As a result the data set (2, 7) will be included in the compressed data set (FIG. 7B). Continue with the above technique, the processor next determines that the remaining five pixels from $P_{4,3}$ to $P_{4,4}$ to $P_{1,4}$ all have a value of 1. Thus, the data set (1, 5) will be included in the compressed data set (FIG. 7B). As shown in FIG. 7B, the compressed data set has a total of ten values, which provides a more effective data compression than the example of FIG. 6C.

It should be noted that the above image data compression technique described with reference to FIGS. 6-7 is not limited to the X-direction, and that the same technique may be utilized to compress image data in any direction, such as the Y-direction. Also, in some embodiments, the adjacent pixels may have respective values that deviate within a prescribed range, and still be grouped together for the purpose of compressing the image data. For example, one pixel may have a value of 2, and its adjacent pixel may have a value of 2.1. In such cases, the two pixels may be grouped together in the above described technique. In some embodiments, a user interface may be provided that allows a user to prescribe a deviation range for grouping pixels. For example, if the user prescribes that the deviation range is 4, then the processor will group two pixels if the difference in their respective pixel values is less than 4.

In any of the embodiments described herein, the compressed image set and the registration matrices may be stored in a non-transitory medium. The compression technique described herein is beneficial because the deformation registration matrices are used to further compress the images, no matter what image compression method is used to compress each image individually. By using the deformation matrix to achieve compression, the resulting compressed image data set and the deformation matrix will take up less memory/storage space (compared to the space required to store the deformation matrix and the compressed image data set that is compressed without using the deformation matrix). In some embodiments, the deformation registration matrices are themselves compressed before they are stored. In other embodiments, the deformation registration matrices are not compressed before they are stored.

Figure 8:
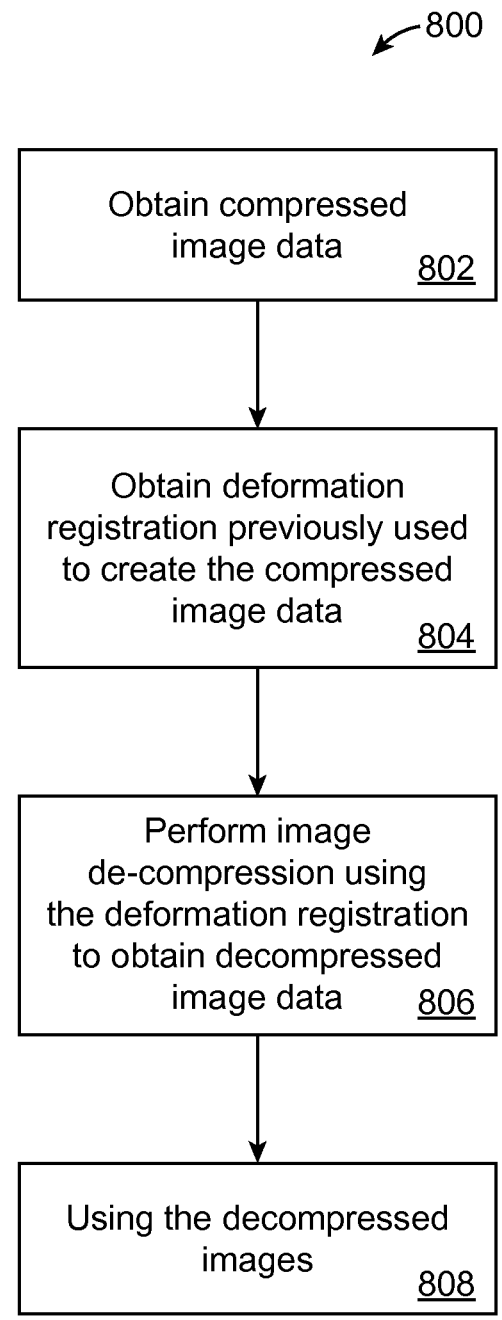
FIG. 8 illustrates a method of decompressing image data that involves deformation registration in accordance with some embodiments.

Another aspect of the embodiments involves retrieving image data that are stored as compressed image data, and performing a "de-compression" procedure to recover the compressed image. The de-compression may be performed in time domain (e.g., for images at different phases). Alternatively, the de-compression may be performed in space domain (e.g., for adjacent image slices for a volumetric image). Alternatively, the de-compression may be performed in the frequency domain. FIG. 8 illustrates a method 800 of decompressing image data that involves deformation registration in accordance with some embodiments. First, compressed image data are obtained (Step 802). In some embodiments, such may be accomplished by a processor (e.g., processor 54) receiving the compressed image data, or by allowing the processor to have access to a medium that stores the compressed image data. In some embodiments, the compressed image data may include compressed image data for a volumetric image (e.g., a CT image, a tomosynthesis image, etc.). In such cases, the decompression method 800 would provide different image slices of the volumetric image. In other embodiments, the compressed image data may include image data that correspond with different respective phases of a physiological cycle (such as a breathing cycle, a cardiac cycle, etc.) of a patient. In such cases, the decompression method 800 would provide different images from a video stream. Each of the images from the video stream may be a two-dimensional image, or a three-dimensional image. In further embodiments, the decompressed images may be images that were previously obtained at different times. Also, in other embodiments, the compressed image data may include image data that are compressed in the space domain and time domain.

Next, a deformation registration previously used to create the compressed image data are obtained (Step 804). In some embodiments, such may be accomplished by a processor receiving the deformation registration information, or by allowing the processor to have access to a medium that stores such information. In some embodiments, the deformation registration is stored as a part of the compressed image data. In such cases, the Steps 802, 804 are combined, and the act of retrieving the stored compressed image data also accomplishes the obtaining of the deformation registration.

Next, the processor performs image decompression on the compressed image data using the deformation registration to obtain decompressed image data (Step 806). In some embodiments, if the deformation registration includes information about a rigid translation of an image portion, the processor may use such information to create an image. Using the example of FIG. 3, the processor may determine that the deformation registration for image slice 302*b* includes a rigid translation of $\Delta X=1$. Thus, starting with the image 302*a*, the processor then applies such $\Delta X$ for the image portion 320*a* (e.g., by shifting the image portion 320*a* in the X-direction by 1 unit) to create the image slice 302*b*. The processor then moves on to the next image slice. In the example, the processor may determine that the deformation registration for image slice 302*c* includes no rigid translation ($\Delta X=0$). Thus, starting with the image 302*b*, the processor then applies such $\Delta X$ for the image portion 320*b* (e.g., by shifting the image portion 320*b* in the X-direction by 0 unit) to create the image slice 302*c*.

In some embodiments, if the deformation registration obtained in Step 804 includes information about a scaling of an image portion, the processor may use such information to create an image. Using the example of FIG. 5, the processor may determine that the deformation registration for image slice 502*b* includes a scaling component of Sy=2. Thus, starting with the image 502*a*, the processor then applies such Sy factor for the image portion 520*a* (e.g., by scaling the image portion 520*a* in the Y-direction by 2) to create the image slice 502*b*. The processor then moves on to the next image slice. In the example, the processor may determine that the deformation registration for image slice 502*c* includes a scaling component of Sx=2. The processor then applies such Sx factor for the image portion 520*b* (e.g., by scaling the image portion 520*b* in the X-direction by 2) to create the image slice 502*c*.

In some cases, if pixels with different respective pixel values are associated with each other during the image compression, the decompressed image may not have exactly the same pixel values as the original uncompressed image. For example, if two pixels with respective pixel values of "2" and "2.1" are associated during the image compression, when the processor decompresses the compressed image set, the processor may determine that both of the pixels have the same value of "2." This is acceptable as long as the different classes of tissue can still be identified from the decompressed image.

In some embodiments, the deformation registration obtained in Step 804 may include one or a combination of translation component(s) (e.g., translation in one or more directions), rotation component(s), and scaling component(s) (e.g., scaling in one or more directions), for each of the image portions in an image. Thus, a deformation registration for mapping two images may include different components for different parts of the same image.

In some embodiments, if the compressed image data are obtained using the technique described with reference to FIGS. 7-8, the processor may use the stored data (such as those shown in FIGS. 7B and 8B) to recreate the image (decompressed image). In some cases, if pixels with different respective pixel values are grouped together during the image compression, the decompressed image may not have exactly the same pixel values as the original uncompressed image. For example, if two pixels with respective pixel values of "2" and "2.1" are grouped during the image compression, when the processor decompresses the compressed image set, the processor may determine that both of the pixels have the same value of "2." This is acceptable as long as the different classes of tissue can still be identified from the decompressed image.

After the decompressed image data are obtained, the decompressed image data may be used for a variety of purposes (Step 808). For example, in some embodiments, the decompressed image data may be displayed on a screen for allowing a user (e.g., a physician, a treatment planner, etc.) to view the images. In other embodiments, the decompressed image data may be stored in a medium for processing.

In the above embodiments, the image data for compression and decompression are CT or tomosynthesis images. In other embodiments, the image data may be other types of images, such as MRI images (in which case, the system would involve using an MRI scanner), ultrasound images, x-ray images, PET images, SPECT images, etc, or any images that are capable of being digitized. In such cases, the above image compression and decompression techniques may be similarly applied for these types of images.

Computer System Architecture

Figure 9:
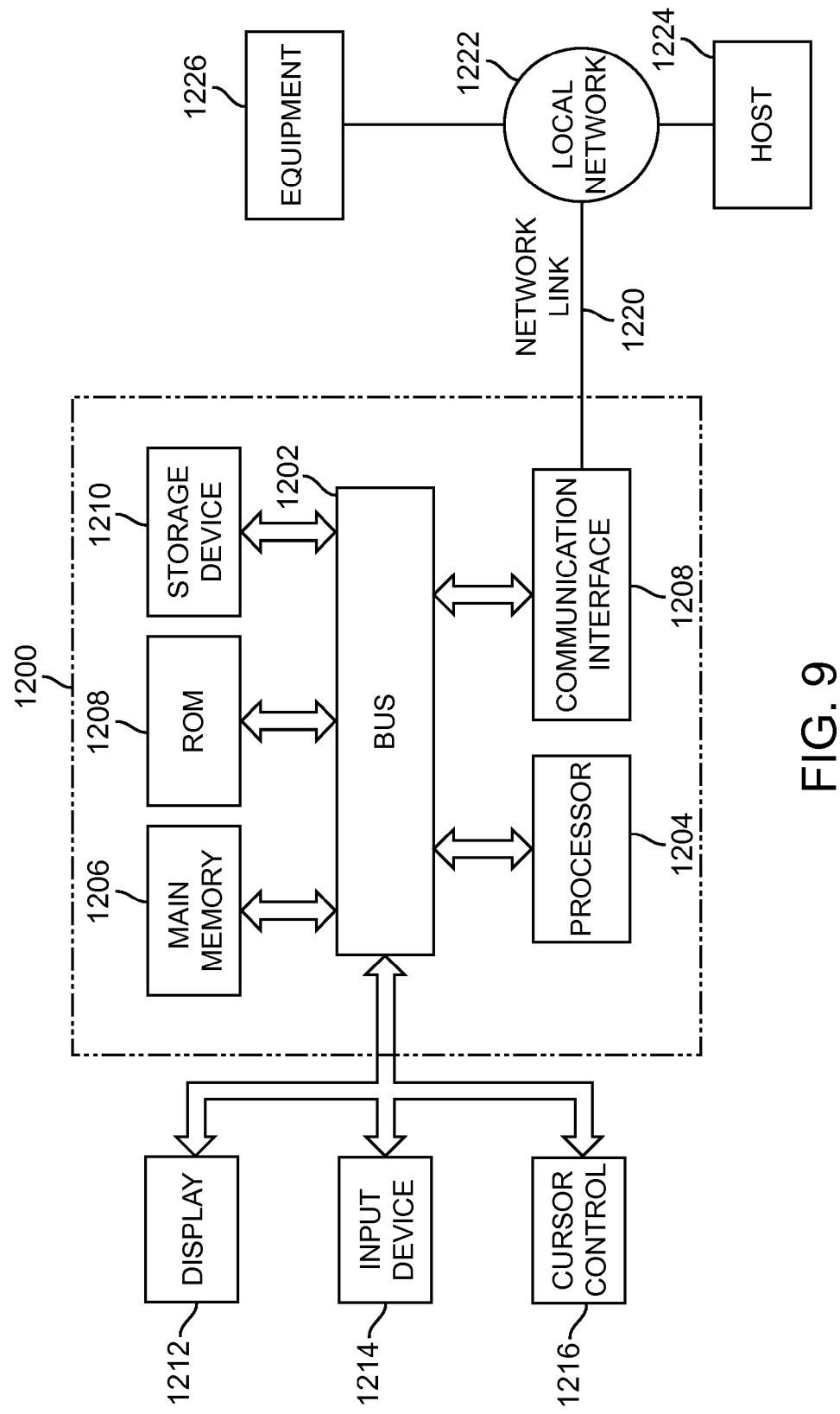
FIG. 9 is a block diagram of a computer system architecture, with which embodiments described herein may be implemented.

FIG. 9 is a block diagram that illustrates an embodiment of a computer system 1200 upon which an embodiment of the invention may be implemented. Computer system 1200 includes a bus 1202 or other communication mechanism for communicating information, and a processor 1204 coupled with the bus 1202 for processing information. The processor 1204 may be an example of the processor 54 of FIG. 1, or another processor that is used to perform various functions described herein. In some cases, the computer system 1200 may be used to implement functions of the processor 54. The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a flat panel, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions (e.g., calculation) in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. Volatile media includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network (s), the network link 1220, and the communication interface 1218.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method of processing image data, comprising:
    obtaining an image set that includes at least a first image and a second image;
    determining a deformation registration using the first and second images, wherein the act of determining the deformation registration is performed using a processor;
    performing data compression on at least a portion of the image set using the determined deformation registration to obtain compressed image data, wherein the compressed image data has less storage requirement compared to a storage requirement of the at least a portion of the image set before the data compression is performed; and
    storing the compressed image data.

2. The method of claim 1, wherein the first and second images are parts of a volumetric CT image.

3. The method of claim 1, wherein the first and second images are parts of a sequence of images.

4. The method of claim 1, wherein the first image corresponds to a first phase of a physiological cycle of the patient, and the second image corresponds to a second phase of the physiological cycle of the patient, the second phase being different from the first phase.

5. The method of claim 1, wherein the deformation registration comprises a translational component, a rotational component, a scaling component, a combination of stretching and compression components, or a combination thereof.

6. The method of claim 1, wherein the deformation registration is determined by:
obtaining from the first image a first plurality of segments;
obtaining from the second image a second plurality of segments; and
mapping each of the first plurality of segments from the first image with a corresponding one of the second plurality of segments from the second image.

7. The method of claim 1, wherein the first image comprises a CT image, a PET image, a SPECT image, a PET-CT image, a tomosynthesis image, a digitized ultrasound image, a digitized fluoroscope image, or a digitized MRI image.

8. The method of claim 1, further comprising storing the deformation registration.

9. A system for processing image data, comprising:
a processor configured for
obtaining an image set that includes at least a first image and a second image,
determining a deformation registration using the first and second images, and
performing data compression on at least a portion of the image set using the determined deformation registration to obtain compressed image data, wherein the compressed image data has less storage requirement compared to a storage requirement of the at least a portion of the image set before the data compression is performed, and
a non-transitory medium for storing the compressed image data.

10. The system of claim 9, wherein the deformation registration comprises a translational component, a rotational component, a scaling component, or a combination thereof.

11. The system of claim 9, wherein the processor is configured to determine the deformation registration by:
obtaining from the first image a first plurality of segments;
obtaining from the second image a second plurality of segments; and
mapping each of the first plurality of segments from the first image with a corresponding one of the second plurality of segments from the second image.

12. The system of claim 9, wherein the non-transitory medium is configured to store the deformation registration.

13. A computer product having a volatile or non-volatile medium that stores a set of instruction, an execution of which by a processor causes a method for processing image data to be performed, the method comprising:
obtaining an image set that includes at least a first image and a second image;
determining a deformation registration using the first and second images;
performing data compression on at least a portion of the image set using the determined deformation registration to obtain compressed image data, wherein the compressed image data has less storage requirement compared to a storage requirement of the at least a portion of the image set before the data compression is performed; and
storing the compressed image data.

14. The computer product of claim 13, wherein the deformation registration comprises a translational component, a rotational component, a scaling component, a combination of stretching and compression component, or a combination thereof.

15. The computer product of claim 13, wherein the deformation registration is determined by:
obtaining from the first image a first plurality of segments;
obtaining from the second image a second plurality of segments; and
mapping each of the first plurality of segments from the first image with a corresponding one of the second plurality of segments from the second image.

16. The computer product of claim 13, wherein the method further comprises storing the deformation registration.

17. A method of processing image data, comprising:
obtaining compressed image data;
obtaining a deformation registration previously used to create the compressed image data;
performing data decompression on the compressed image data using the deformation registration to obtain decompressed image data, wherein the act of performing the data decompression is performed using a processor, and wherein the compressed image data has less storage requirement compared to a storage requirement of the decompressed image data; and
storing the decompressed image data.

18. The method of claim 17, wherein the decompressed image data is a part of a volumetric CT image.

19. The method of claim 17, wherein the decompressed image data is a part of a sequence of images.

20. The method of claim 17, wherein the decompressed image data comprises a first image that corresponds to a first phase of a physiological cycle of the patient, and a second image that corresponds to a second phase of the physiological cycle of the patient, the second phase being different from the first phase.

21. The method of claim 17, wherein the deformation registration comprises a translational component, a rotational component, a scaling component, a combination of stretching and compression components, or a combination thereof.

22. The method of claim 17, wherein the decompressed image data includes a first image and a second image, and wherein the deformation registration includes information for mapping each of a first plurality of segments from the first image with a corresponding one of a second plurality of segments from the second image.

23. A system for processing image data, comprising:
a processor configured for
obtaining compressed image data,
obtaining a deformation registration previously used to create the compressed image data, and
performing data decompression on the compressed image data using the deformation registration to obtain decompressed image data, wherein the compressed image data has less storage requirement compared to a storage requirement of the decompressed image data; and
a non-transitory medium for storing the decompressed image data.

24. The system of claim 23, wherein the deformation registration comprises a translational component, a rotational component, a scaling component, or a combination thereof.

25. The system of claim 23, wherein the decompressed image data includes a first image and a second image, and wherein the deformation registration includes information for mapping each of a first plurality of segments from the first image with a corresponding one of a second plurality of segments from the second image.

26. A computer product having a volatile or non-volatile medium that stores a set of instruction, an execution of which by a processor causes a method for processing image data to be performed, the method comprising:
   obtaining compressed image data;
   obtaining a deformation registration previously used to create the compressed image data;
   performing data decompression on the compressed image data using the deformation registration to obtain decompressed image data, wherein the compressed image data has less storage requirement compared to a storage requirement of the decompressed image data; and
   storing the decompressed image data.

27. The computer product of claim 26, wherein the deformation registration comprises a translational component, a rotational component, a scaling component, a combination of stretching and compression components, or a combination thereof.

28. The computer product of claim 26, wherein the decompressed image data includes a first image and a second image, and wherein the deformation registration includes information for mapping each of a first plurality of segments from the first image with a corresponding one of a second plurality of segments from the second image.

* * * * *